United States Patent [19]

Fraver

[11] Patent Number: 5,147,164
[45] Date of Patent: Sep. 15, 1992

[54] DRILL BIT DEPTH MINDER

[76] Inventor: Paul C. Fraver, 725 Edison Rd., Dauphin, Pa. 17018

[21] Appl. No.: 770,448

[22] Filed: Oct. 3, 1991

[51] Int. Cl.⁵ ........................ B23B 49/00; B23B 51/02
[52] U.S. Cl. .................................... 408/202; 408/226
[58] Field of Search .................. 408/113, 202, 241 S, 408/14, 241 R, 226; 409/218; 82/153, 154; 83/529; 33/628, 638

[56] References Cited

U.S. PATENT DOCUMENTS

| | | | |
|---|---|---|---|
| 272,425 | 2/1883 | Goodwin | 408/202 |
| 716,441 | 12/1902 | Latham | 408/202 |
| 2,361,683 | 10/1944 | Greenberg | 408/202 X |
| 3,552,503 | 1/1971 | Lebar | 175/40 |
| 4,705,436 | 11/1987 | Robertson | 408/202 X |
| 4,993,894 | 2/1991 | Fischer et al. | 408/14 |

FOREIGN PATENT DOCUMENTS

| | | | |
|---|---|---|---|
| 171830 | 2/1986 | European Pat. Off. | 408/202 |
| 2410547 | 9/1975 | Fed. Rep. of Germany | 408/202 |

OTHER PUBLICATIONS

Sporty's Tool Shop, 1985 Catalog: 1902T Drill Stop Set.
Article entitled "Electric Drills" (undated).
Hardware Age, May 17, 1962: a screw drill and plug mate, p. 94.
Hardware Age, Dec. 1969, p. 143: advertisement of Century Drill & Tool Co., 322 South Green, Chicago, Ill. 60607.

Primary Examiner—Steven C. Bishop
Attorney, Agent, or Firm—Marion P. Lelong

[57] ABSTRACT

The depth minder comprises a drill bit having a shank and an integrally attached flange, with male threads thereon, which has a larger diameter than the shank so that it prevents drilling to a deeper depth than the length of the drill bit beyond the flange. A primary spacer is also used which has female threads to accept the male threads of the flange partially into the top of the spacer, a bottom surface, and a central hole which is large enough to accommodate the largest sized drill bit of a series of bits, thereby further selectively reducing the drilling depth. One or more adaptor spacers of plastic or of metal are additionally used to provide additional options regarding the depth of penetration desired for the drill bit. Such an adaptor spacer is adhesively attached to the bottom surface of the primary spacer or to the lower surface of the flange, thereby providing a range of drilling depths. If made of metal, the bottom surface of the adaptor spacer is preferably covered with felt in order to prevent marring of the work surface.

13 Claims, 1 Drawing Sheet

DRILL BIT DEPTH MINDER

BACKGROUND OF THE INVENTION

1. Field of the Invention

This invention relates to a drill bit for drilling blind holes to a selected depth and especially relates to accessories providing depth choices to the drill operator for each drill bit of a desired diameter.

2. Review of the Prior Art

When drilling blind holes into wood, plywood, flakeboard, particle board, hardboard, and composite materials such as veneered wood and wood bonded to materials such as "FORMICA", a trademark of the Formica Corporation, 155 Rte. 46W, CN 980, Wayne, N.J. 07474, for various high-pressure laminated plastic sheets of melamine and phenolic materials used especially as decorative laminates and for chemical and heat-resistant surfaces, it can be very difficult to avoid doing irreparable damage by drilling the blind hole mere fractions of an inch too deeply. When drilling holes into wall panelling behind which pipes or electric wires may lie, it is also important to keep the hole as dependably shallow as possible. Further, when drilling holes into automobile body panels behind which electrical wires, control cables, and the like may lie, it is essential that the drill bit dependably penetrate very little more than the thickness of the metal.

U.S. Pat. No. 3,552,503 describes a clean-out drill for drilling and cleaning out the dust-like residue of drilling blind holes in concrete. The drill comprises the combination of a drill shank having helical relief flutes with a reduced-diameter cutting section and a terminal section of selected diameter and length providing a shoulder spaced from the cutting tip, and with a simple washer fitted over the reduced-section drill shank and welded to the abutment lands between the relief flutes on the drill shank. The circular hole of the washer cooperates with the relief flutes to provide discharge passageways through which the residue of drilling is moved from one side to the other side of the washer for effecting discharge by centrifugal force laterally of the blind hole.

U.S. Pat. No. 4,993,894 describes a drill for drilling holes in masonry and comprises a depth stop mounted on the drill shank and formed as a resilient anti-vibration element in order to avoid damage to the masonry surface. The depth stop is formed of polyurethane or a similar plastic material. During swiveling movement while undercutting the drilled hole, the contact face of the depth stop lying against the wall surface does not change its position so that the wall surface not only sustains no damage, but also the optimum contact area of the depth stop with the wall surface is maintained while reaming out the undercut.

An adjustable drill stop set, advertised in a 1985 catalog of Sporty's Tool Shop, comprises stops for drill sizes ⅛ inch through ½ inch in 1/16 increments which are slipped over a drill bit to a measured depth and secured by tightening an Allen head locking screw which is mounted in the stop.

A plastic depth gauge, which locks to the shaft of a drill bit at any required distance to limit the depth of a hole, is described in an article entitled "Electric drills" and subtitled "The ½-inch drill".

A screw drill and plug mate, made by Great Neck Saw Mfrs., Inc., Dept HA, Mineola, N.Y., is described in *Hardware Age*, May 17, 1962. The "screw drill is adjustable to any length of wood screw. It drills a precision hole for screw body, countersinks, counterbores, and automatically stops at pre-set depth. Drills the correct diameter for woodscrews 5-to-14, counterbores for flat head screws, putty or wood plug."

The Century Drill Stop, made by Century Drill & Tool Co., 322 South Green, Chicago, Ill. 60607 and advertised on page 143 of the December 1969 issue of *Hardware Age*, fits over a drill bit, has a knurled top, threads therebeneath, and a knurled lower part which apparently allows setting at a desired distance from the tip of the bit to make holes having a uniform depth.

An advertisement labelled "MASTER MECHANIC" for a "5-Pc. Cordless Drill Bit Set" has been noted as a True Value$^R$ savings coupon.

These drill stops have various disadvantages, such as limited adjustability or requiring use of set screws. A drill stop which is a part of a drill bit and also has a simply operable depth adjusting means is needed.

SUMMARY OF THE INVENTION

It is therefore an object of this invention to provide a depth spacer device, herein termed a "depth minder", which is a fixed part of a drill bit.

It is also an object to provide a depth minder which additionally comprises a primary adjusting means for adjustably obtaining decreased spacing from the end of the drill bit.

It is further an object to provide a depth minder which additionally comprises a secondary adjusting means that can be selectively attached to the primary adjusting means or to the depth minder itself.

In accordance with these objects and the principles of this invention, a depth minder is provided which comprises:

A. a drill bit comprising a shank and an integrally attached flange having male threads thereon, a lower face, and a larger diameter than the shank;

B. a spacer having female threads to accept the male threads of the flange partially into the top of the spacer, a bottom surface, and a central hole which is large enough to accommodate the largest sized drill bit of a series; and C. an adaptor spacer, having a central hole large enough for the largest sized drill bit of the series, which provides additional options regarding the depth of penetration desired for the drill bit and is selectively attached to the lower face of the flange or to the bottom surface of the primary spacer, the top of the adaptor spacer being provided with a selectively usable adhesive and the bottom surface of the adaptor spacer being selectively provided with a felt covering.

Every flange of each drill bit of a series of diameters is standardized as to diameter and threads. The lower face of the flange, the bottom surface of the primary spacer, or the bottom surface of the adaptor spacer contacts the work surface and prevents further penetration of the work.

When decreased penetration is desired as compared to that provided by the flange, the primary spacer, which has a knurled outer surface, is slipped over the drill bit and threadedly attached to the flange. The bottom surface of the spacer, being closer to the tip of the drill bit than the lower face of the flange, thereby reduces the penetration of the drill bit into the work. The spacer is standardized so that it may be used with any other drill bit of any length or diameter in the series and with all other flanges.

The adaptor spacer provides additional options regarding the depth of penetration desired. The top of the adaptor spacer is preferably provided with an adhesive coating which is protected until use by a plastic overlay disc. After removal of this disc, the adaptor spacer may be attached to the lower face of the flange or to the bottom surface of the spacer. However, other means of applying adhesive to the top of the adaptor spacer may be utilized, such as two-faced tape.

The flange and the spacer are made of metal, but the adaptor spacer may be made of metal or of plastic. If made of plastic, polyurethane, nylon, "DELRIN", a trademark for an acetate end-capped acetal homopolymer resin, of the I. E. du Pont de Nemours & Co., Inc. polycarbonate, and other rigid and semi-rigid plastics are preferred. If made of metal, the bottom of the adaptor spacer is provided with a felt pad surface which is intended to protect the surface of finished wood work or painted metal from marring.

This depth minder is useful for drilling both blind holes and starter holes for inserting various types of fasteners in a wide array of textured work surfaces. It is characterized by simplicity, safety, convenience, practicability, and versatility.

The advantage of this device with its attachments over other products of a similar nature is that no additional tools such as Allen wrenches and the like are needed to attach either the spacer, which functions as the secondary depth stop, or the adaptor spacer, which functions as the tertiary depth stop, to the flange which operates as the primary depth stop. Moreover, an entire set of adaptor spacers may be used to obtain a range of drilling depths between the depths provided by the lower face of the flange and by the bottom surface of the primary spacer and also to obtain smaller drilling depths than the depth provided by the thickest adaptor spacer.

The threads of the flange and of the spacer being machined to countermand the direction of rotation of the drill bit, there is no possibility that these two units might separate. With one spacer and one adaptor spacer, the operator of the drill is provided with four separate options relating to the depth of the hole he wishes to drill. Each additional spacer and each additional adaptor spacer provides two additional options.

The purpose of the depth minder of this invention is to provide professionals of various occupations, general handymen, and home owners with a fool-proof tool for drilling blind holes to a guaranteed depth in various types of material, such as wood, metal, panelling, and the like, where irreparable damage would result if the blind hole is drilled mere fractions of an inch too deeply. In general, the depth minder is designed to eliminate almost entirely the causes for drilling too deeply; namely, carelessness, inattentiveness, inaccessibility, viewing restrictions, and inexperience.

DETAILED DESCRIPTION OF THE INVENTION

Figure 1:
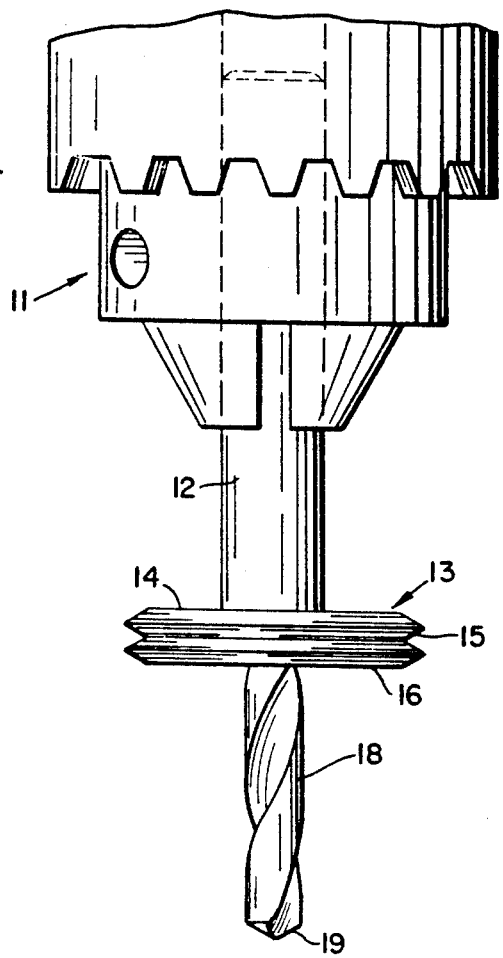
FIG. 1 is an elevation of the drill chuck and depth minder, including its shank, flange, and drill bit.

The drill minder, without accessories as shown in FIG. 1, comprises a shank 12 which is secured in chuck 11 of a drill, a flange 13 having a top 14, threads 15, and a lower face 16, and a drill bit 18 having a tip 19.

Figure 2:
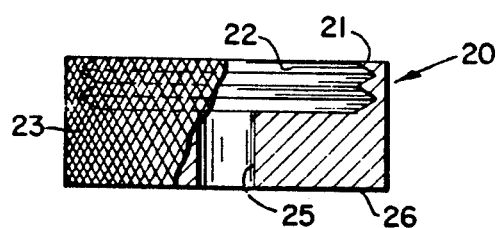
FIG. 2 is an elevation of the spacer, partially broken away to show the female threads and the central hole.

Primary spacer 20, shown in FIG. 2, comprises a top surface 21, female threads 22, a knurled outer surface 23, a central hole 25, and a bottom surface 26.

Figure 3:
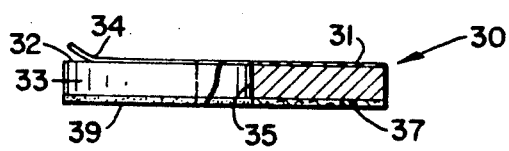
FIG. 3 is an elevation of the adaptor spacer, partially broken away and made of rigid plastic.
Figure 4:
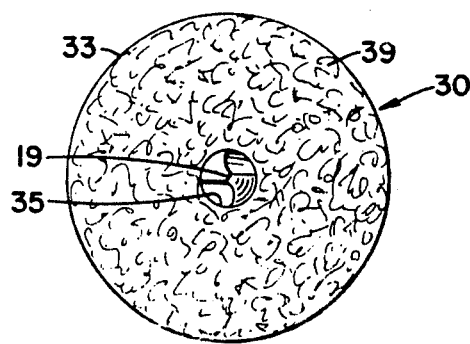
FIG. 4 is a bottom view of the depth minder having both the spacer and the adaptor spacer attached, the tip of the drill bit being in the center.

Adaptor spacer 30, shown in FIGS. 3 and 4, comprises a top surface 31, an outer cylindrical surface 33, a central hole 35, and a bottom surface 37. If adaptor spacer 30 is made of metal, bottom surface is preferably covered with a felt cover 39. However, if adaptor spacer 30 is made of plastic, felt cover 39 may not be necessary. An adhesive layer 32 and a peelable disc 34 cover top surface 31. Circular two-sided tape, having a central hole, can be provided with each adaptor spacer for replacement use. Similarly, instead of felt pads, a set of "buffer pads" which are sticky on one side and have a soft material on the other side, can be furnished with each size of adaptor spacer.

EXAMPLE

Using a crude replica of the drill bit having a shank and an integrally attached flange, made by gluing a washer onto the shank of a standard drill bit, it appeared that the residuals of a drilling operation were dissipated from between the hole and the work surface by the rapid revolutions of the washer which generated a whirling, fan-like action, increasing in intensity as the washer neared the work surface. This action tended to blow away residuals from between the approaching depth stop (i.e., the washer) and the work surface.

Another advantage of the depth minder is that it is not necessary for the operator of the drill to have visual contact with lines, colors, and the like on the shaft of the drill, a requirement that can lead to disastrous errors in conditions of poor lighting or dirt.

Because it will be readily apparent to those skilled in the art of drilling blind holes to a selected depth that innumerable variations, modifications, applications, and extensions of the principles hereinbefore set forth can be made without departing from the spirit and the scope of the invention, what is hereby defined as such scope and is desired to be protected should be measured, and the invention should be limited, only by the following claims.

What is claimed is:

1. A depth minder that comprises:
   A. a shank which is fastenable within the chuck of a drill;
   B. a flange, having male threads on the outer circumference thereof, which is rigidly attached to said shank;
   C. a drill bit, having flutes extending to said shank, which is rigidly attached to said shank and to said flange;
   D. a primary spacer which is axially movable into contact with said flange and threadably attachable thereto, said primary spacer comprising:
      1) female threads which are threadably attachable to said male threads, and
      2) a bottom surface; and
   E. an adaptor spacer which is adhesively attachable to said bottom surface.

2. The depth minder of claim 1, wherein said adhesive attachment is accomplished with double-sided tape.

3. The depth minder of claim 2, wherein said double-sided tape is circular and has a central hole.

4. A depth minder that comprises:
   A. a shank which is fastenable within the chuck of a drill;
   B. a flange, having male threads on the outer circumference thereof, which is rigidly attached to said shank;
   C. a drill bit, having flutes extending to said shank, which is rigidly attached to said shank and to said flange;
   D. a primary spacer which is axially movable into contact with said flange and threadably attached thereto, said primary spacer comprising:
      1) female threads which are threadably attachable to said male threads, and
      2) a bottom surface;
   E. an adaptor spacer which is attachable to said bottom surface; and
   F. a set of buffer pads, which are sticky on one side and have a soft material on the other side, that are provided with each size of said adaptor spacer.

5. A depth minder comprising a drill bit having a shank and an integrally attached flange which has:
   A. male threads on the outer circumference thereof; and
   B. a larger diameter than said shank so that the lower face of said flange prevents drilling to a deeper depth than the length of said drill bit beyond said flange.

6. The depth minder of claim 5, wherein a primary spacer is used for further selectively reducing said drilling depth.

7. The depth minder of claim 6, wherein said primary spacer has a top and female threads which partially accept said male threads of said flange into said top.

8. The depth minder of claim 7, wherein said primary spacer also has a bottom surface and a central hole which is large enough to accommodate the largest sized drill bit of a series of drill bits.

9. The depth minder of claim 8, wherein at least one adaptor spacer is additionally used to provide additional options for said drilling depth.

10. The depth minder of claim 9, wherein said adaptor spacer is selectively made of plastic or of metal.

11. The depth minder of claim 10, wherein said adaptor spacer is adhesively attached to said bottom surface of said primary spacer or to said lower surface of said flange.

12. The depth minder of claim 11, wherein said adaptor spacer is made of metal and is provided with a felt pad attached to its bottom surface, whereby the surfaces of material being drilled are protected from marring.

13. The depth minder of claim 11, wherein said adaptor spacer is provided with circular two-sided tape having a central hole for adhesive attachment to its top surface and to said bottom surface of said primary spacer or to said lower surface of said flange.

* * * * *